(12) United States Patent
Stefan et al.

(10) Patent No.: US 10,574,797 B2
(45) Date of Patent: Feb. 25, 2020

(54) METHOD FOR CONFIGURING A DEVICE CONNECTED TO A FIELD BUS

(71) Applicant: Schneider Electric Industries SAS, Rueil-Malmaison (FR)

(72) Inventors: Iulia D. Stefan, Marktheidenfeld (DE); Klaus Winkelhoefer, Osterburken (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 9 days.

(21) Appl. No.: 15/838,440

(22) Filed: Dec. 12, 2017

(65) Prior Publication Data
US 2018/0176341 A1 Jun. 21, 2018

(30) Foreign Application Priority Data

Dec. 20, 2016 (EP) ..................................... 16306742

(51) Int. Cl.
*H04L 29/06* (2006.01)
*H04L 12/24* (2006.01)
*H04L 12/40* (2006.01)
*H04L 29/08* (2006.01)

(52) U.S. Cl.
CPC ........ *H04L 69/18* (2013.01); *H04L 12/40169* (2013.01); *H04L 12/40176* (2013.01); *H04L 41/0806* (2013.01); *H04L 41/0853* (2013.01); *H04L 41/0889* (2013.01);
(Continued)

(58) Field of Classification Search
CPC ................ H04L 69/18; H04L 41/0853; H04L 12/40169; H04L 41/0889; H04L 41/0806; H04L 12/40176; H04L 2012/4026; H04L 67/06; H04L 67/12
See application file for complete search history.

(56) References Cited

U.S. PATENT DOCUMENTS 5,613,096 A * 3/1997 Danknick ............... H04L 29/06
   709/236
8,514,712 B1 8/2013 Aswadhati
(Continued)

FOREIGN PATENT DOCUMENTS

DE 10 2006 057 133 A1 6/2008
EP 0 713 310 A2 5/1996

OTHER PUBLICATIONS

Extended Search Report dated Mar. 14, 2017 in European Patent Application No. 16306742.4.

*Primary Examiner* — Dady Chery
(74) *Attorney, Agent, or Firm* — Oblon, McClelland, Maier & Neustadt, L.L.P.

(57) ABSTRACT

The invention relates to a method for configuring a device connected to a field bus, comprising:
providing a field bus which is based on an Ethernet network,
providing a first device connected to the field bus,
transmitting a broadcast message from the new device over the field bus, wherein the broadcast message requests information about a field bus protocol used on the field bus and/or to be used by the new device,
sending a configuration response in response to the broadcast message from the first device to the new device, wherein the configuration response comprises information at least about a field bus protocol used on the field bus and/or to be used by the new device.

16 Claims, 2 Drawing Sheets

Figure 1:
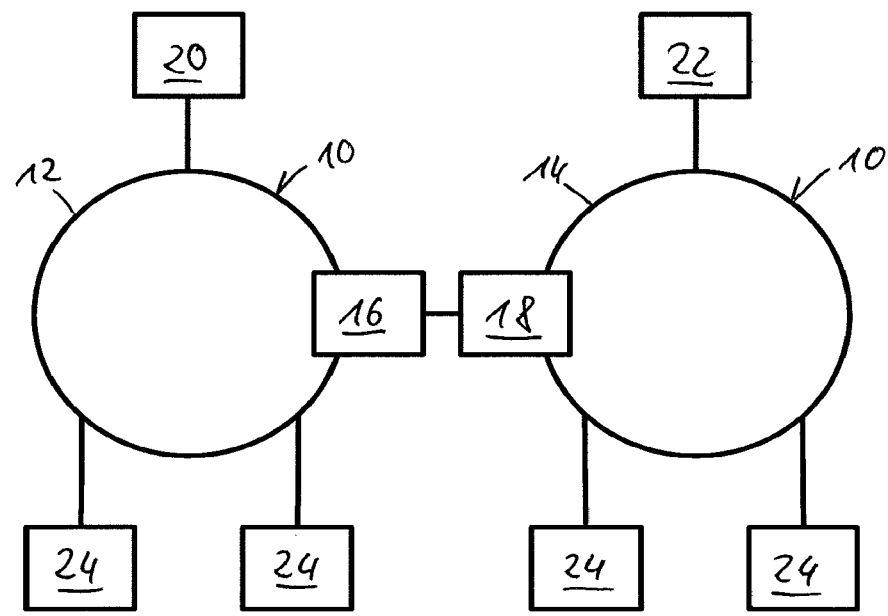

(52) U.S. Cl.
CPC .............. *H04L 67/06* (2013.01); *H04L 67/12* (2013.01); *H04L 2012/4026* (2013.01)

(56) References Cited

U.S. PATENT DOCUMENTS

| | | |
|---|---|---|
| 2003/0056043 A1 | 3/2003 | Kostadinov |
| 2010/0040075 A1* | 2/2010 | Kalhoff ................ H04L 12/403 370/402 |

* cited by examiner

METHOD FOR CONFIGURING A DEVICE CONNECTED TO A FIELD BUS

The present invention relates to a method for configuring a device which is being connected to a field bus.

As industrial processes become more and more automated, more and more devices are supposed to communicate with each other using different communication protocols. In industrial/automated processes usually field busses are used to connect different devices. A field bus allows different devices to communicate with each other, e.g. using a specific field bus protocol.

The devices connected to the field bus, e.g. field devices and controllers, may use different field bus protocols such as Sercos III, EIP (Ethernet/IP), ProfiNet IO, etc. Different field bus protocols can be used for different applications. For technical reasons, only some field bus protocols can be used at the same time. Thus, it is not possible to activate all field bus protocols simultaneously.

If a new device is connected to a field bus for the first time, it is necessary for the new device to acquire information about the protocol (or the protocols) that is (are) used on the field bus. One possibility for the new device to determine the used protocol(s) is to start sniffing the network to produce a statistic about the data packets or telegrams sent over the network in order to derive the used field bus protocol(s). Analyzing the sent telegrams can take place at OSI layer 2 and/or OSI layer 4.

However, sniffing and producing a statistic requires a relatively long time and is not deterministic. Due to the time required, the boot-up time of the new device can be increased. Further, it is a disadvantage that sniffing e.g. at OSI layer 2 requires a relatively complex implementation for example in an FPGA (Field Programmable Gate Array).

Therefore, it is the object of the present invention to provide a method for configuring a device newly connected to a field bus that allows a fast and reliable configuration of the new device based on the field bus protocols used on the field bus.

This object is achieved by a method having the features of claim 1.

Particularly, this object is satisfied by a method comprising:
  providing a field bus which is based on an Ethernet network,
  providing a first device connected to the field bus,
  connecting a new device to the field bus,
  transmitting a message, preferably a broadcast message, from the new device over the field bus, wherein the message or broadcast message requests information about a field bus protocol used on the field bus and/or about a field bus protocol to be used by the new device,
  sending a configuration response in response to the message or broadcast message from the first device to the new device, wherein the configuration response comprises information at least about a field bus protocol used on the field bus and/or to be used by the new device.

In other words, if a device is newly connected to the field bus, it requests information about a field bus protocol (which is used by some or all devices already connected to the field bus or which shall be used by the new device) using a broadcast message, wherein at least one device (the first device) provides the required configuration information in the form of the configuration response. The configuration response can comprise information about at least one of the field bus protocols used on the field bus and/or information about a field bus protocol which is designated to be used by the new device. In any event, the configuration response can comprise information about multiple field bus protocols which are used on the field bus and/or are intended for use by the new device.

The invention is based on the finding that a time-consuming sniffing of a network can be omitted, if the new device actively "asks" for its required configuration/for the used field bus protocol(s) and/or the protocol(s) to be used on the field bus.

The method according to the invention has several advantages. Firstly, the use of a broadcast message allows the new device to retrieve information about the used field bus protocol without having any knowledge about the structure of the field bus or about the used field bus protocol, as the broadcast message requires no knowledge about devices already connected to the field bus. Furthermore, the broadcast message may be received and understood by every device connected to the field bus. Therefore, the first device is not required to be a field device or to be able to communicate using a field bus protocol. Finally, as every device receives the broadcast message, it is possible that every device connected to the field bus can in principle be used as the first device which sends the configuration response to the new device.

The method of the invention reliably and deterministically allows the new device to identify the used field bus protocols and/or the field bus protocols to be used, as these field bus protocols can be listed in the configuration response. Since only two messages are required, namely the broadcast message from the new device and the configuration response from the first device, the method of the invention is very fast and can be tested without extensive effort.

The broadcast message and the configuration response preferably only use the basic Ethernet functionality of the field bus. It is possible that the first device sends the configuration response as a broadcast, thus allowing the new device to receive the configuration response, even if an IP-address has not yet been assigned to the new device.

In the following, further aspects of the invention are described in more detail.

Preferably, the first device can utilize at least a first field bus protocol to communicate over the field bus. The broadcast message can request information about the first field bus protocol which is used by the first field device. Correspondingly, the configuration response can comprise information about the first field bus protocol.

The broadcast message can have as payload a request for the configuration response. The configuration response can comprise information about devices connected to the field bus and one or more field bus protocols that can be used to communicate with a respective device.

Hereinafter, the term "broadcast message" shall mean the broadcast message requesting information about a field bus protocol used on the field bus and/or to be used by the new device, if not explicitly stated differently.

The field bus that connects different devices is the hardware required to establish a data connection between the connected devices, e.g. network cables, hubs, switches, etc. The field bus uses an Ethernet network as physical layer for transmitting information. Particularly, the field bus (i.e. the field bus hardware) allows using different field bus protocols to transfer data between different devices connected to the field bus. The field bus protocols can all be Ethernet-based protocols which use the same Ethernet physical layer.

The broadcast message can be a broadcast which is directed to the broadcast address 255.255.255.255, thus ensuring that the broadcast is only transmitted in the subnet of the new device. Advantageously, the broadcast allows an easy and fast integration of the new device, as no initial knowledge about the field bus and/or already connected devices is required.

For the broadcast message and/or the configuration response, the MAC (Media Access Control)-address of the new device can be used to identify the new device.

The new device is a device which is newly connected to the field bus. In other words, the new device is added to the field bus.

The devices connected to the field bus (e.g. the first device and/or the new device) each can be a field device or a controller (e.g. a PLC—Programmable Logic Controller).

Preferably the configuration response is sent from the first device to the new device as a unicast message. Thereby only the new device will receive the configuration response.

Preferably the broadcast message and/or the configuration response are transmitted using UDP (User Datagram Protocol), e.g. at port 35053. Each of the broadcast message and/or the configuration response can comprise one UDP data packet, only. Thereby, the payload of the broadcast message and/or the configuration response can be limited e.g. to around 1200 bytes. UDP is usually understood by all devices connected to an Ethernet-based field bus, independent of the used field bus protocol. The use of UDP therefore allows the transmission of the broadcast message and/or the configuration response independent of the used field bus protocol.

The first device can run a first service that receives the broadcast message and sends the configuration response. In the same way the new device can run a second service that sends the broadcast message and receives the configuration response. Both services can use the above-mentioned port 35053.

Advantageously, in response to the configuration response, the new device activates at least one field bus protocol stored in a memory of the new device in order to use the activated protocol to communicate over the field bus. In other words, the field bus protocol or the information needed to use a specific field bus protocol are already stored in the new device itself, i.e. the information is initially stored in the new device. The field bus protocol stored in the new device can comprise a protocol stack, the required drivers, configurations, definitions, software and/or firmware and the like. Storing the field bus protocol in a memory of the new device bears the advantage that e.g. no large protocol stack has to be transmitted over the field bus which can be very time consuming. Thus, the timespan required to activate the field bus protocol can be very short, e.g. in the range of milliseconds up to a few seconds. The new device can be configured to activate a maximum number of 2 or 3 different field bus protocols at the same time.

It is preferred that at least two different field bus protocols are stored in a memory of the new device. For example, field bus protocols for Sercos III, EIP, EtherCAT, TSN (Time Sensitive Networking), Modbus TCP and/or ProfiNet IO can be stored in the new device. Thereby, independent of the used field bus protocol, the new device can quickly start communicating with the first device and other devices connected to the field bus.

Preferably the new device uses at least one of the field bus protocols stored in the memory of the new device to communicate over the field bus. If more than one field bus protocols are stored in the new device a selection of one or more field bus protocols can take place. The selected field bus protocols are then activated and used. If only one field bus protocol is stored in the new device, the new device can only communicate with other devices using the same field bus protocol.

It is preferred if the configuration response (C) comprises a configuration table which lists one or more field bus protocols to be used by the new device. Thus, the configuration response can only comprise information about the field bus protocol(s) that are to be used by the new device. Particularly, the configuration response can comprise (as payload) only the configuration table which lists only one or more than one field bus protocol(s) to be used by the new device, Advantageously the configuration table includes a list of devices connected to the field bus and one or more field bus protocols that can be used to communicate with the respective device. The list can e.g. be in the XML-format (eXtensible Markup Language) and can comprise a name, an IP (Internet Protocol)-address and/or a MAC-address of each device. An example of a configuration table is given below.

```
<?xml version="1.0" encoding="utf-8"?>
<protocolconfiguration>
    <metainfo>
        <provider ip4address="192.168.3.100" port="44444"
creationdate="2016-09-22T23:15:00"/>
    </metainfo>
    <protocols>
        <fielddevice name="Hugo" ip4address="192.168.1.128">
            <protocol name="sercos3">
                <provider ip4address="192.168.3.100"/>
            </protocol>
            <protocol name="ethernetip">
                <provider ip4address="192.168.2.100"/>
            </protocol>
        </fielddevice>
        <fielddevice name="Claire" ip4address="192.168.2.22">
            <protocol name="sercos3">
                <provider ip4address="192.168.3.100"/>
            </protocol>
        </fielddevice>
        <fielddevice name="Tim" ip4address="192.168.2.23">
            <protocol name="sercos3">
                <provider ip4address="192.168.3.100"/>
            </protocol>
            <protocol name="modbustcp">
                <provider ip4address="192.168.3.100"/>
            </protocol>
        </fielddevice>
    </protocols>
</ protocolconfiguration>
```

In the above example, three devices (field devices) are listed, which are connected to the same field bus. The three devices are named "Hugo", "Claire" and "Tim". "Hugo" can be reached under the IP-address 192.168.1.128, wherein the field bus protocols "sercos3" (Sercos III) and "ethernetip" (Ethernet/IP) can be used. The device "Claire" has the IP-address 192.168.2.22 and can be contacted using the field bus protocol "sercos3" (Sercos III). "Tim" has the IP-address 192.168.2.23 and can utilize the field bus protocols "sercos3" (Sercos III) and "modbustcp" (Modbus TCP).

The device providing the information for all three devices ("Hugo", "Claire" and "Tim") has the IP-address 192.168.3.100. Thus, the device with the IP-address 192.168.3.100 can be the first device which sends the configuration response to the new device. The new device can e.g. be one of the devices "Hugo", "Claire" and "Tim" or a device that is not listed in the configuration table.

The information comprised in the configuration response and/or the configuration table can be compiled when the field bus network is planned, e.g. manually or by an automated process. The first device can then send configuration responses to all new devices that are connected to the field bus one after another or at the same time.

Advantageously the configuration response only comprises the configuration table as payload. In other words, the configuration response can be very small and only the configuration table is transmitted (apart from required headers and further information that is required e.g. by the UDP protocol). Thereby, a very small configuration response can be achieved, particularly in comparison to the transmission of a whole protocol stack over the field bus. This allows increasing the speed of the configuration of the new device.

Particularly it is possible that—contrary to the above XML example—the used field bus protocol is represented by a single number, only. In principle, the payload of the configuration response can therefore only comprise one single number which identifies and/or represents the field bus protocol to be used by the new device.

Preferably the configuration table is already stored in the first device, before the configuration table is transmitted over the field bus. The first device could also be termed a "configuration provider" in which the configuration of the field bus is stored. The first device can therefore comprise information about the field bus protocols used by the devices connected to the field bus. The first device can receive an initial configuration table from a server, e.g. a cloud storage, or a configuration tool.

Advantageously the first device allows modifying the configuration table, particularly via a request transmitted over the field bus. The first device can provide a service (e.g. integrated in the first service mentioned above) that allows to add, to remove and/or to modify entries in the configuration table. Furthermore, the first device can communicate with the new device after the new device has received the configuration response in order to add the new device to the configuration table and in order to determine the field bus protocols which can be used to communicate with the new device. The first device can also scan the field bus to identify other devices connected to the field bus and to investigate which field bus protocols can be used to communicate with the other devices. After scanning the field bus, the first device can update the configuration table.

Preferably the first device is adapted to transfer the configuration table to a second device, wherein the second device is then enabled to respond to the broadcast message with the configuration response. Thus, the configuration table can be stored in the second device after the second device has received the configuration table from the first device. Thereby, the capability to respond to broadcast messages of new devices can be transferred to the second device. Alternatively, the first and the second device can simultaneously be configured to respond to the broadcast message, e.g. from the new device and/or from other devices connected to the field bus. Also, the first and second device can be configured to respond only to broadcast messages received from a predefined IP- or MAC-address range. Thereby the number of broadcast messages to be processed by the first or second device can be limited.

Further preferably the configuration table is transmitted to the second device using TFTP (Trivial File Transfer Protocol). TFTP can be easily implemented in the first and the second device, e.g. by means of a freeware client or a freeware server. TFTP can be used independent of the operating system of the first and the second device, thereby allowing a cross-platform transfer of the configuration table.

It is possible that the first device and the second device are connected to different subnets of the field bus, the subnets being connected by a router, wherein the configuration table is transmitted to the second device using the router. The router can be adapted to provide a TFTP client and/or to allow passing through the transferred configuration table. By transmitting the configuration table to a different subnet, the devices connected to the different subnet can be enabled to communicate with the subnet of the first device and the subnet of the second device. E.g., a new device can then be configured to use a first field bus protocol in one subnet and a second field bus protocol to communicate with devices of a further subnet. Also, existing devices can be re-configured upon receiving a configuration table from a different subnet.

For example, it is possible that the first device transmits its configuration table to the second device in a second subnet. The second device can then combine the configuration table from the first device with its own configuration table. The combined configuration table can then hold information about all devices connected to the subnet of the first device and the subnet of the second device. If the new device is connected to the subnet of the second device, the new device sends the broadcast message to all devices of the subnet of the second device. The second device receives this broadcast message and replies with a unicast configuration response to the new device. The configuration response can comprise the combined configuration table. Due to the combined configuration table, the new device is enabled to communicate with all devices of both subnets using the field bus protocol specified in the configuration table for a specific device. The new device then also has information about the devices connected to the field bus.

It is preferred if further information, i.e. information that is not included in the configuration response, can be transmitted to the new device or the first device, e.g. using services, particularly UDP services. These services can be used to transmit an initial configuration table to the first device. This initial configuration table can then be used by the first device to send a configuration response to the new device.

Advantageously the broadcast message is transmitted by the new device during boot-up or directly after boot-up of the new device. Also, the configuration response can be received and processed during boot-up or directly after boot-up. Thereby the new device can immediately start communicating with other devices connected to the field bus with the correct protocol, as soon as boot-up is finished. During boot-up, the new device can utilize a standard IP/Ethernet-protocol stack to transmit the broadcast message and to receive the configuration response. Preferably at least one of the first device, the second device and/or the new device is a field device, a controller (e.g. a PLC—Programmable Logic Controller) or a personal computer (PC). Particularly, one or more of the devices connected to the field bus can be field devices in the form of sensors or actors. Also, one or more of the devices can be a tool running on a personal computer.

Particularly the used field bus protocols are Ethernet-based protocols, preferably real-time field bus protocols, e.g. Sercos III, EIP, EtherCAT, TSN (Time Sensitive Networking), Modbus TCP and/or ProfiNet IO. For example, Sercos III could be used as a primary field bus protocol for motion applications, which is combined with EIP as secondary field bus protocol for input/output (IO) applications. These two field bus protocols can further be combined with Modbus TCP as a third field bus protocol for commissioning applications. Thus, three different field bus protocols could be used side by side (e.g. at the same time) on the same field bus, i.e. on the same field bus hardware.

In general, it would be possible to replace the broadcast message with a different message, e.g. a UDP message or a unicast UDP message. The disclosure with respect to the broadcast message is analogously valid for the different message.

The invention also relates to a system comprising a field bus, at least a first device connected to the field bus and a new device adapted to transmit a broadcast message over the field bus after the new device has been connected to the field bus. The broadcast message requests information about a field bus protocol used on the field bus and/or to be used by the new device. The first device is adapted to send a configuration response in response to the broadcast message to the new device, wherein the configuration response comprises information at least about a field bus protocol used on the field bus and/or to be used by the new device. Furthermore, the invention also relates to a device (i.e. the first device) which is adapted to communicate over a field bus and which is further adapted to receive a broadcast message requesting information about a field bus protocol used on the field bus and/or to be used by a new device, wherein the device is adapted to send a configuration response in response to the broadcast message over the field bus, wherein the configuration response comprises information at least about a field bus protocol used on the field bus and/or to be used by the new device.

Finally, the invention relates to a device (i.e. the new device) which is adapted to communicate over a field bus, wherein the device is adapted to transmit a broadcast message over the field bus, wherein the broadcast message requests information about a field bus protocol used on the field bus and/or to be used by the device, and wherein the device is adapted to receive a configuration response, wherein the configuration response comprises information at least about a field bus protocol used on the field bus and/or to be used by the device. The device is adapted to use that field bus protocol after reception of the configuration response.

The advantages, preferable features and embodiments of the inventive method described in the foregoing also apply to the inventive system and the inventive devices.

Figure 2:
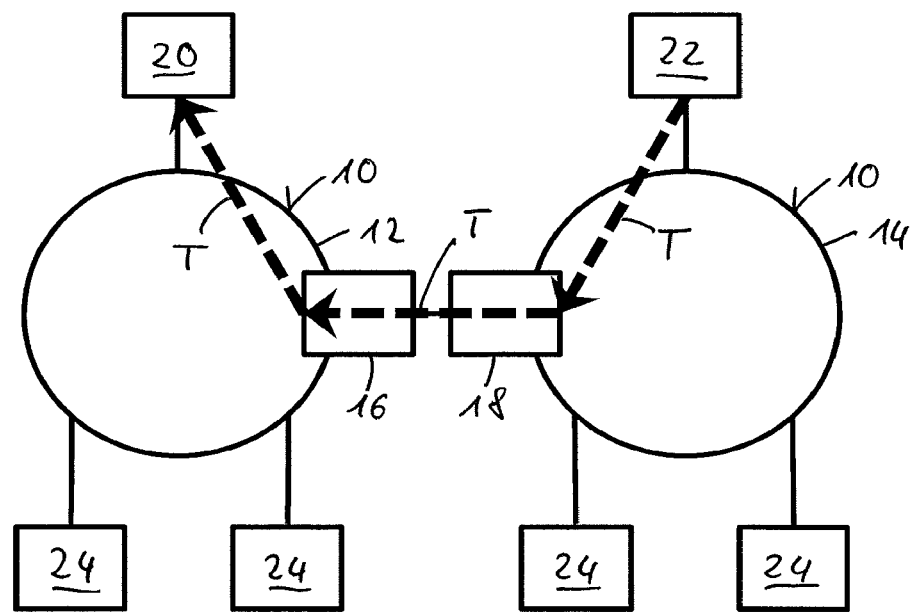
Figure 3:
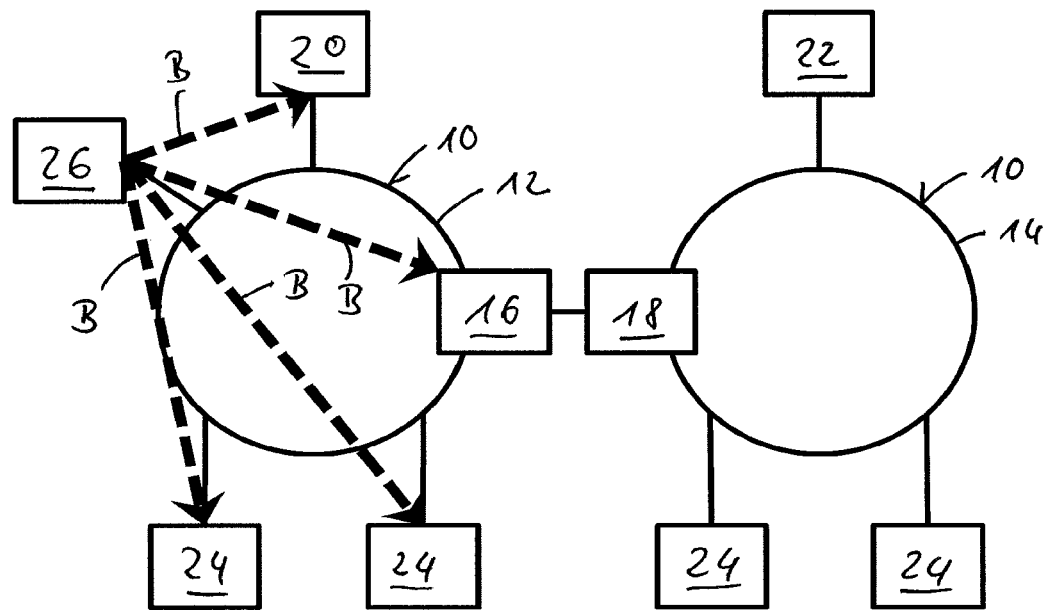

The invention will be explained in the following in detail by means of exemplary embodiments and with reference to the figures in which are shown:

FIG. 1 a field bus with several field devices connected to two subnets;

FIG. 2 the transmission of a configuration table;

FIG. 3 a broadcast message from a new field device; and

Figure 4:
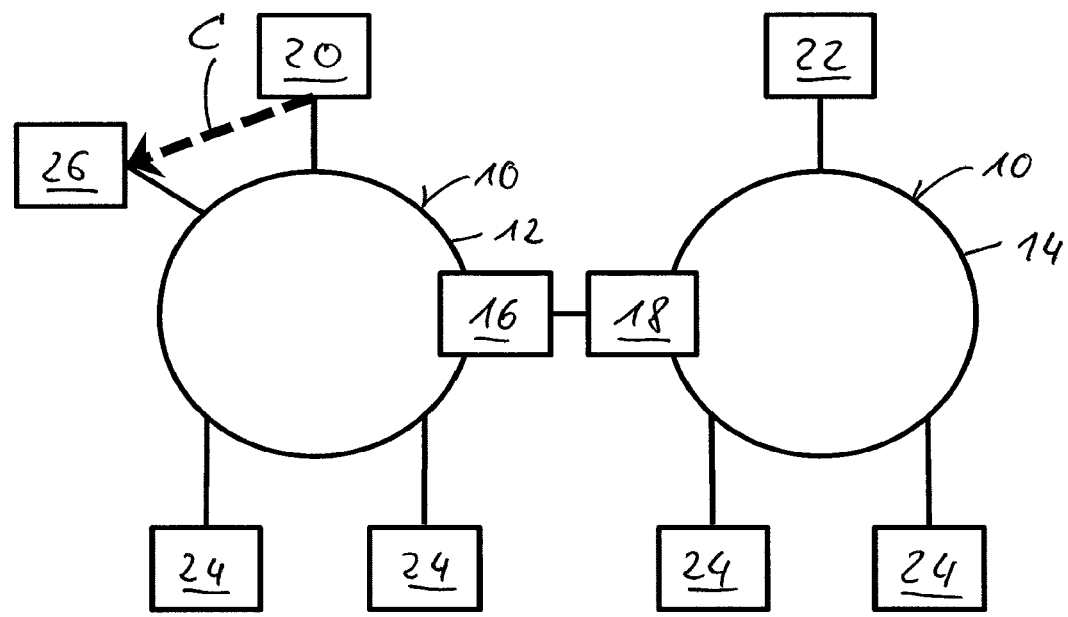

FIG. 4 the transmission of a configuration response.

FIG. 1 shows a field bus 10 having a first subnet 12 and a second subnet 14. The first and second subnet 12, 14 are connected via a first router 16 and a second router 18. The first router 16 is connected to the first subnet 12 of the field bus 10, whereas the second router 18 is connected to the second subnet 14 of the field bus 10.

A first field device 20 is connected to the first subnet 12; a second field device 22 is connected to the second subnet 14. The first and second subnet 12, 14 also comprise other field devices 24.

The first and the second field device 20, 22 utilize different field bus protocols to communicate over the field bus 10. The first and second field device 20, 22 can be configured as a controller in the respective subnet 12, 14, wherein the first and second field devices 20, 22 control the other field devices 24 of the respective subnet 12, 14 in order to perform an automated task (not shown).

The first and second field device 20, 22 can both comprise a configuration table which lists all devices of the first or second subnet 12, 14, respectively. In order to allow e.g. the first field device 20 to distribute information about all devices connected to the first and the second subnet 12, 14 the second field device 22 can transmit its configuration table to the first field device 20.

A transmission T of the configuration table from the second field device 22 to the first field device 20 is shown in FIG. 2. For the transmission T TFTP (Trivial File Transfer Protocol) can be used. The transmission T uses the first and second router 16, 18 to transmit the configuration table from the second field device 22 to the first field device 20. In the first field device 20, the configuration table received from the second field device 22 can be integrated into the already existing configuration table of the first field device 20.

As shown in FIG. 3, a new field device 26 is connected to the field bus 10, particularly to the first subnet 12. The new field device 26 transmits a broadcast message B over the first subnet 12. The broadcast message B requests information about the field bus protocol or the field bus protocols used on the field bus 10. The first field device 20 receives the broadcast message B.

As shown in FIG. 4, the first field device 20 replies with a unicast message to the new field device 26, wherein the unicast message comprises a configuration response C that is based on the configuration table stored in the first field device 20. The configuration response C comprises the IP-addresses and/or MAC-addresses of all devices connected to the field bus 10. Furthermore, the configuration response C comprises information about different field bus protocols that are to be used when communicating with different devices of the field bus 10. For example, the configuration response C can state that the Sercos III protocol is to be used for communication with the first field device 20, whereas the Ethernet IP protocol is to be used if the new device 26 wishes to communicate with the second field device 22.

Alternatively, the configuration response C can only comprise information about one or more field bus protocol(s) to be used by the new field device 26. This/These field bus protocol(s) is/are then used for all communication of the new field device 26.

Further alternatively, instead of using a unicast message, the first device 20 can reply with a broadcast to transmit the configuration response C to the new device 26. The broadcast can use the MAC-address of the new device 26 to be received by the new device 26, even if no IP-address has been assigned to the new device 26.

Due to the configuration response C, the new field device 26 can activate the respective field bus protocols and can start communicating with all devices of the first and second subnet 12, 14, immediately. Particularly, if the new field device 26 is to communicate with the first field device 20, the Sercos III field bus protocol is used as a first field bus protocol. In contrast, if the new field device 26 is to communicate with the second field device 22 the Ethernet IP protocol is used (as a second field bus protocol).

The use of the broadcast message and the configuration response therefore allow a fast, easy and deterministic integration of the new field device 26 into an existing field bus 10.

LIST OF REFERENCE NUMBERS

10 field bus
12 first subnet 14 second subnet
16 first router
18 second router
20 first field device
22 second field device
24 other field devices
26 new field device
B broadcast message
C configuration response
T transmission of configuration table

The invention claimed is:

1. A method for configuring a device connected to a field bus, the method comprising the steps of:
providing a field bus which is based on an Ethernet network,
providing a first device connected to the field bus,
connecting a new device to the field bus,
transmitting a broadcast message from the new device over the field bus, wherein the broadcast message includes a broadcast address as a destination address and requests information about a field bus protocol used on the field bus and/or to be used by the new device,
sending a configuration response in response to the broadcast message from the first device to the new device, wherein the configuration response comprises information at least about a field bus protocol used on the field bus and/or to be used by the new device, wherein
the configuration response comprises a configuration table which lists one or more field bus protocols to be used by the new device, wherein
the configuration table comprises a list of devices connected to the field bus and one or more field bus protocols that can be used by the new device to communicate respectively with each device in the list of devices.

2. The method of claim 1, wherein
at least one of the broadcast message and the configuration response are transmitted using UDP (User Datagram Protocol).

3. The method of claim 1, wherein,
in response to the configuration response, the new device activates at least one field bus protocol stored in a memory of the new device in order to use the activated protocol to communicate over the field bus.

4. The method of claim 1, wherein
at least two different field bus protocols are stored in a memory of the new device.

5. The method of claim 1, wherein
the configuration response only comprises the configuration table as payload.

6. The method of claim 1, wherein
the configuration table is stored in the first device, before the configuration table is transmitted over the field bus.

7. The method of claim 1, wherein
the first device allows modifying the configuration table.

8. The method of claim 7, wherein
the first device allows modifying the configuration table via a request transmitted over the field bus.

9. The method of claim 1, wherein
the first device is adapted to transfer the configuration table to a second device, wherein the second device is then enabled to respond to the broadcast message with the configuration response.

10. The method of claim 9, wherein
the configuration table is transmitted to the second device using TFTP (Trivial File Transfer Protocol).

11. The method of claim 10, wherein
the first device and the second device are connected to different subnets of the field bus, the subnets being connected by a router, wherein the configuration table is transmitted to the second device using the router.

12. The method of claim 1, wherein
the broadcast message is transmitted by the new device during boot-up or directly after boot-up.

13. The method of claim 1, wherein
at least one of the first device, the second device and the new device is one of a field device, a controller and a Personal Computer.

14. The method of claim 1, wherein the broadcast message further comprises a Media Access Control address of the new device.

15. The method of claim 1, wherein the configuration table comprising the list of devices connected to the field bus and the one or more field bus protocols that can be used by the new device to communicate respectively with each device in the list of devices comprises a first table entry identifying a first device having a first address and which can be communicated with by the new device using a first protocol, a second table entry identifying a second device having a second address and which can be communicated with by the new device using a second protocol, wherein the first and second protocols are different.

16. The method of claim 1, wherein the configuration response is received by the new device before an IP address has been assigned to the new device.

* * * * *